R. ATKIN.
Neck-Yoke and Combined Draft-Tongue and Equalizer.
No. 199,174. Patented Jan. 15, 1878.
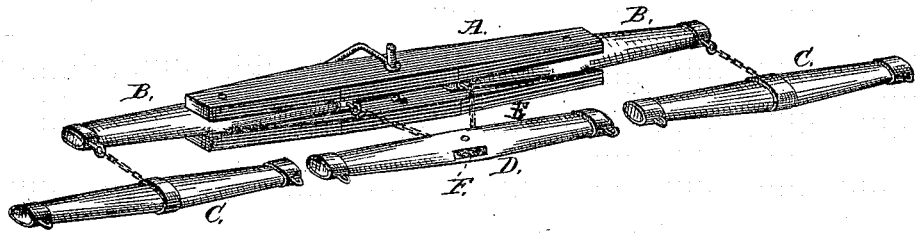
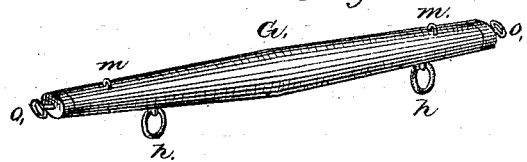
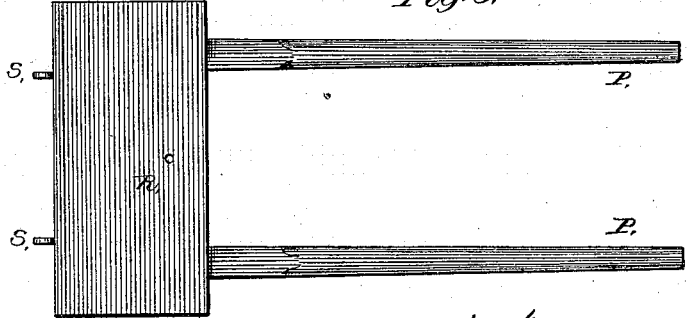
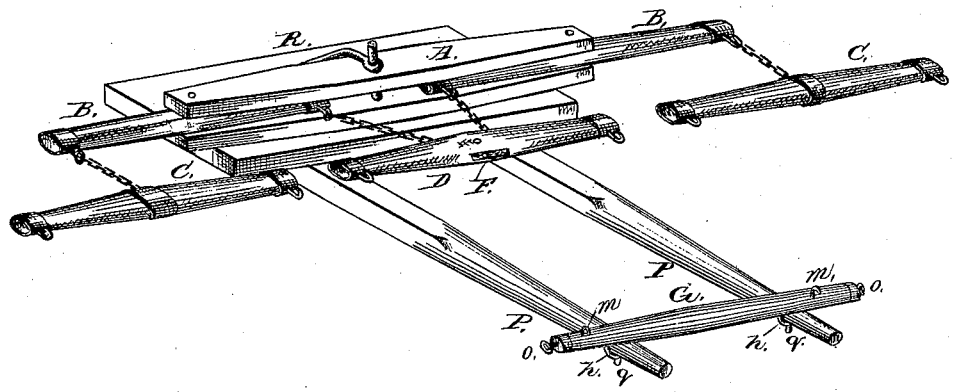

UNITED STATES PATENT OFFICE.

ROBERT ATKIN, OF IOWA CITY, IOWA.

IMPROVEMENT IN NECK-YOKES AND COMBINED DRAFT TONGUES AND EQUALIZERS.

Specification forming part of Letters Patent No. 199,174, dated January 15, 1878; application filed June 20, 1877.

*To all whom it may concern:*

Be it known that I, ROBERT ATKIN, of Iowa City, in the county of Johnson and State of Iowa, have invented new and useful Improvements in Three-Horse Draft-Equalizers, Neck-Yokes, and Draft-Tongues, which improvements are fully set forth in this specification.

The improvements are especially adapted to a team of three horses abreast in drawing vehicles, plows, and other machines of heavy draft. In using such a team the draft should be equalized, when one of the outer horses pulls suddenly ahead, by distributing the back draft between the other two horses, and the team should be coupled back as near to the machine as practicable. The neck-yoke should be sustained by all of the horses, and have an even bearing upon the middle horse if the other two should work unevenly. The draft-tongue should separate the middle horse from the outer horses, and be adapted to the neck-yoke.

To accomplish these ends is the object of my invention.

The improvements consist, first, in an equalizer composed of a double-tree, a bar pivoted about one-third of its length from its outer end to each end of the double-tree, a single-tree connected to the outer end of each bar, and a middle single-tree connected to the inner end of each bar by a cord or chain around a central pulley in the single-tree.

The improvements further consist in a long neck-yoke having rings to receive and support the ends of a double tongue, and having suitable means for the attachment of the breast-straps of the three horses to the yoke.

The improvements further consist in a double tongue of two poles adapted to receive the neck-yoke, and connected by a platform, upon which the double-tree of the equalizer can be supported and pivoted.

Figure 1 is a view of the equalizer; Fig. 2, a view of the neck-yoke; Fig. 3, a view of the double tongue; and Fig. 4, a view of all in position for use.

The equalizer has a double-tree, A, bars B B, and single-trees C, C, and D. The double-tree may be two pieces with the bars B B pivoted between them, or may be a single piece with the bars pivoted on it. The single-tree D has a middle pulley, F, around which a cord or chain passes. The neck-yoke is a bar, G, having supports $h\ h$ for the poles of the double tongue, also attachments $m\ m$ for the breast-straps of the middle horse, and connections $o\ o$ for the breast-straps of the outer horses. The double tongue has poles P P, platform R connecting them, means, as $s\ s$, for attachment to a vehicle or other machine, and neck-yoke catches $q\ q$.

By the combined use of the equalizer, the neck-yoke, and the tongue, a three-horse team can be worked satisfactorily and to great advantage.

What I claim as my invention is—

1. A three-horse neck-yoke consisting of a neck-yoke bar having attachments for the breast-straps of three horses, and two supports for two poles, substantially as set forth.

2. The combination of a three-horse neck-yoke having bar G, pole-supports $h\ h$, and breast-strap attachments $m\ m\ o\ o$, and a three-horse draft-tongue having poles P P, neck-yoke catches $q\ q$, platform R, and attachments $s\ s$, substantially as and for the purposes set forth.

3. The combination of a three-horse draft-equalizer having double-tree A, bars B B, single-trees C C D, cord or chain E, and pulley F in the single-tree D, a three-horse neck-yoke having bar G, pole-supports $h\ h$, and breast-strap attachments $m\ m\ o\ o$, and a three-horse draft-tongue having poles P P, neck-yoke catches $q\ q$, platform R, and attachments $s\ s$, substantially as and for the purposes set forth.

ROBERT ATKIN.

Witnesses:
 A. C. YOUMKIN,
 GEO. B. EDMONDS.